(12) United States Patent
Peabody (10) Patent No.: US 8,116,724 B2
(45) Date of Patent: Feb. 14, 2012

(54) SYSTEM CONTAINING LOCATION-BASED PERSONAL EMERGENCY RESPONSE DEVICE

(75) Inventor: Steven R. Peabody, Lebanon, IN (US)

(73) Assignee: VoCare, Inc., Lebanon, IN (US)

( * ) Notice: Subject to any disclaimer, the term of this patent is extended or adjusted under 35 U.S.C. 154(b) by 261 days.

(21) Appl. No.: 12/387,938

(22) Filed: May 11, 2009

(65) Prior Publication Data

US 2010/0285771 A1  Nov. 11, 2010

(51) Int. Cl.
*H04M 11/04* (2006.01)

(52) U.S. Cl. .................. 455/404.2; 455/404.1; 455/457; 455/521; 455/88; 455/556.1; 455/575.6; 455/156.1; 340/573.1; 340/573.4; 340/539.13; 340/686.1

(58) Field of Classification Search ............... 455/404.1, 455/404.2, 457, 521, 88, 556.1, 575.6, 156.1; 340/573.1, 573.4, 539.13, 686.1
See application file for complete search history.

(56) References Cited

U.S. PATENT DOCUMENTS

| | | |
|---|---|---|
| 5,115,224 A | 5/1992 | Kostusiak et al. |
| 5,305,370 A | 4/1994 | Kearns et al. |
| 5,742,233 A | 4/1998 | Hoffman et al. |
| 6,044,257 A | 3/2000 | Boling et al. |
| 6,166,639 A | 12/2000 | Pierce et al. |
| 6,169,484 B1 | 1/2001 | Schuchman et al. |
| 6,201,476 B1 | 3/2001 | Depeursinge et al. |
| 7,072,659 B2 | 7/2006 | White, Jr. |
| 7,231,200 B2 | 6/2007 | Jenkins |
| 7,403,598 B2 | 7/2008 | Tyroler et al. |
| 7,733,224 B2 | 6/2010 | Tran |
| 2003/0027547 A1 | 2/2003 | Wade |
| 2005/0093709 A1* | 5/2005 | Franco et al. .............. 340/686.1 |
| 2007/0155380 A1 | 7/2007 | Cao et al. |
| 2007/0286375 A1 | 12/2007 | Baum |
| 2008/0129518 A1 | 6/2008 | Carlton-Foss |
| 2009/0315719 A1 | 12/2009 | Song et al. |
| 2010/0222645 A1 | 9/2010 | Nadler et al. |

* cited by examiner

*Primary Examiner* — Kwasi Karikari
(74) *Attorney, Agent, or Firm* — Maginot, Moore & Beck LLP (57) ABSTRACT

A safety system comprising a plurality of wearable transceiver devices for operation in independent use with a plurality of a landline-based phone and a cell phone to establish contact between a user of a wearable transceiver device and a central monitoring station. The wearable transceiver devices sense a crash or a fall and notify a monitor by a landline-based phone or a cell phone of this incident and the assisted GPS determined location of the incident. The information is provided to the monitor a short predetermined time following activation unless the device is deactivated by pressing a communication button. When the device has not been activated by a crash or fall, the user may press the communication button to communicate with the monitor to obtain a wide variety of services. A cell phone having reserve batteries, accelerometers, and assisted GPS location capabilities is also disclosed.

4 Claims, 6 Drawing Sheets

SYSTEM CONTAINING LOCATION-BASED PERSONAL EMERGENCY RESPONSE DEVICE

CROSS-REFERENCE TO RELATED APPLICATIONS (Not applicable)

STATEMENT REGARDING FEDERALLY SPONSORED RESEARCH OR DEVELOPMENT (Not applicable)

REFERENCE TO SEQUENTIAL LISTING, A TABLE, OR A COMPUTER PROGRAM LISTING APPENDIX SUBMITTED ON A COMPACT DISC (Not applicable)

BACKGROUND OF THE INVENTION

1) Field of the Invention

The field of this invention is security and safety systems for combining a plurality of wearable transceiver devices with cell phones or land-line based phones to establish contact with central monitoring systems.

2) Description of the Related Art

According to the National Highway and Traffic Safety Administration, the first 60 minutes of care after a multiple trauma injury are crucial. Trauma experts often refer to this crucial life or death time period as the "Golden Hour." Experts in the field have determined that during the Golden Hour the likelihood of death increases 1 percent for every minute lost before emergency care arrives.

Falls are one of the most serious health risks among seniors over the age of 65, affecting more people than stroke and heart attacks combined. More than half of all falls by seniors take place in the home. 50% of people who fall require assistance from someone else to get up. Getting help quickly after a fall reduces risk of hospitalization by 26% and death by over 80%. After a fall or other emergency, 90% of people who get help within one hour will continue independent living, but after 12 hours without help only 10% of people will continue to live at home. (New England Journal of Medicine)

Senior citizens age 70 and over have the greatest risk of fire death. The fire death risk among seniors is more than double the average population.

Senior citizens are also subject to Alzheimer's disease. One feature of this condition is the patient may wander from home and get lost. Another feature is that the patient may not be able to give his or her name and address to strangers so that they may be of assistance.

Older adults want to use technology to age safely in their homes, but 80 percent of people 65-plus are not willing to pay more than $50 a month for the technology, a new AARP study says. The report found that people 65-plus want to try technology like home security services, sensors to detect falls, and devices to regulate temperature, lights and appliances, but are worried about installation and maintenance costs and technical issues.

"Almost nine in ten older Americans want to be able to stay in their own homes and they are willing to use technology that can help them do that," says Eleanor Ginzler, AARP Sr. Vice President for Livable Communities.

Many of the features and devices used in the present invention are available in the prior art. Thus, U.S. Pat. No. 5,115,224, granted to Kostusiak et al May 19, 1992, describes a personal security system wherein a portable transmitter sends an emergency signal to several transceivers. One of the transceivers produces an alarm signal and sends the alarm signal to a central station.

U.S. Pat. No. 5,305,370, granted to Kearns et al Apr. 19, 1994, describes a personal security system having a portable transmitter operable by the user, which transmitter can be operated in an emergency. Activation of the transmitter causes a base unit to operate a telephone line and dial 9-1-1. The telephone line also opens a two-way speaker system to allow voice-to-voice contact between the user and the emergency response monitor. The transmitter contains an emergency activation button to initiate the call and a cancel switch to end the calling process.

U.S. Pat. No. 5,742,233, granted to Huffman et al Apr. 21, 1998, describes a personal security and tracking system in which a remote alarm switch may be carried by a user. When the user activates the switch a portable signaling unit carried by the user sends a transmission which includes geographical location to a central dispatch station.

U.S. Pat. No. 6,044,257, granted to Boling et al Mar. 28, 2000, describes a cellular phone containing a large button which, when pressed, establishes voice-to-voice contact with an emergency response center. The cellular phone also carries a GPS system so that the emergency response center becomes aware of the phone's location.

U.S. Pat. No. 6,166,639, granted to Pierce et al Dec. 26, 2000, describes a personal emergency response system comprising a sensor to be worn by the user. When the sensor is activated, distress information is transmitted from the sensor to a central monitoring station via a receiver, an auto-dialer, and a telephone line and voice-to-voice communication between the user and the station is established.

U.S. Pat. No. 6,169,484, granted to Schuchman et al Jan. 2, 2001, describes a personal location system wherein users carry RF transponders provided with digital electronic identification numbers and emergency switches. There is a service center which monitors the location of the users who should remain within prescribed local areas.

US Published Application No. 2003/00227547 filed by Wade on Jul. 16, 2001 describes an emergency communication system in which the user carries a wireless transceiver which, when activated, signals a base unit which in turn connects the user to a central monitoring station.

U.S. Pat. No. 7,231,200, granted to Jenkins Jun. 12, 2007, describes a personal emergency communication system wherein a user-carried portable communications unit has a single button which, when depressed by the user, wirelessly sends a call request signal to a base unit. The base unit places a telephone call to an emergency response center and puts an emergency operator in voice-to-voice communication with the user.

Each of the above disclosures is incorporated herein by reference.

BRIEF SUMMARY OF THE INVENTION

The present invention addresses the issue of providing rapid emergency response following a vehicle crash and the issue of aiding the elderly to live in their own homes while assuring rapid contact with assistance providers in the event such assistance is needed.

The present invention is concerned with security and safety systems. The wearable transceiver devices of these systems refers to devices which may be worn or carried by a plurality of users in the same family or other group in or near their own dwelling areas or while traveling. The wearable transceiver device may take the form of key fobs, pendants, belt clips, and watches. When the user is at a long distance from his or her dwelling area it is necessary that the user also carry a cell phone allowing the person to be directly connected with a central monitoring station, an emergency response dispatcher, or a caregiver. Technically, a cell phone is a wearable transceiver device. However, in the present description and claims cell phones are expressly excluded from the grouping described by this term. The cell phone of the present invention contains an assisted GPS chip to allow the determination of the geographical coordinates of the cell phone. The cell phone of this invention has the ability to establish voice-to-voice contact between the wearable transceivers and the central monitoring station.

The wearable transceiver devices of this invention may be equipped with two 3-axis G-Force sensors, one programmed to be capable of detecting the event of a crash and the other being programmed to be capable of detecting the event of a perceived fall so that the device is capable of sensing a crash or fall. In the event of a crash or fall, the sensor activates a transmitter carried by the wearable transceiver device. Unless the transmitter is deactivated by the pressing of a communication button carried by the wearable transceiver device within a predetermined time, the device will remotely connect with either a cell phone or a land-line based phone to automatically dial a number connecting the wearable transceiver device with a central monitoring station. The cell phone also sends the geographical coordinates of the device via SMS.

The wearable transceiver devices may connect with the central monitoring station through either a cell phone or land-line based phone if the user presses the communication button. In connecting to the central monitoring station, the cell phone sends the geographical coordinates as well as the ability to begin voice-to-voice communication. A plurality of persons in the same family or other group may be protected by the same system simultaneously.

In order to insure the existence of battery power the wearable transceiver devices and the cell phone are equipped with reserve batteries which can provide emergency power to the main batteries in the event the main batteries lose their charge.

DETAILED DESCRIPTION OF THE INVENTION

With reference to FIGS. 1-5, the present invention concerns safety and security systems 2 which are capable of connecting users 4 to central monitoring stations 6. The system 2 is made up of wearable transceiver devices 8 which may take the form of key fobs, pendants, belt clips, and watches; a home-based stationary land-line based phone 10; a portable cell phone 12; cell phone towers 14 having geographical coordinate determining equipment; GPS-determining satellites 16; and a central monitoring station 6 having human monitors 18.

The various features of the wearable transceiver device 8 are available in the prior art and do not require a detailed description. The wearable transceiver device 8 has a watertight casing which permits the user 4 to carry it or wear it around the wrist or neck while in the shower. The wearable transceiver device 8 contains a small radio signal transceiver which may be worn or carried on the person. The wearable transceiver device 8 contains a speaker allowing the device 8 to be a speaker phone. The wearable transceiver device 8 has one accelerometer to determine the event of a fall and a second accelerometer to determine the event of a crash. The wearable transceiver device 8 has an audible timer which alerts the user 4 that a crash or fall event message will be sent to the central monitoring station 6 unless the transmitter is inactivated within a given time. The wearable transceiver device 8 has a communication button 20 which may be used to prevent the wearable transceiver device 8 from sending an unnecessary message indicating a fall or crash. The communication button 20 can also be pushed to put the user 4 in voice-to-voice communication with the central monitoring station 6. The wearable transceiver device 8 communicates with the cell phone 12 or the home-based unit 10 via the well-known Zigbee radio signal transmission.

One of the features of the wearable transceiver devices 8 of the present invention is built-in crash or perceived fall detection feature which is a 3-axis G-force sensor accelerometer programmed to report a fall upon a 1-5 G activation and a 3-axis G-force sensor accelerometer programmed to report a crash upon a 5 or more G activation. An example of such a feature is the BMA 150 device provided by Bosch. Another example is the triaxial accelerometer combined with two-way transceiver made available by Zigbee. When sensing a crash or perceived fall, data are calculated in the delta velocity (Delta V), which is the most accurate measurement. The knowledge of this data allows a monitor 18 to determine the severity of a crash and to inform the rescue personnel of what might be expected. Note that the sensor may be activated to send a preprogrammed signal to the land-line based phone 10 or the cell phone 12 by the user 4 falling or by the user 4 simply dropping the wearable transceiver device 8. The sensor appreciates a sudden change in velocity but does not appreciate the distinction between these two events and in this specification the term "perceived fall" is used to describe both events. An accelerometer may be programmed to be activated by a 1 G force change which would indicate a fall and another accelerometer may be programmed to be activated by a 5 G force change which would indicate a crash.

The cell phone of this invention contains an assisted GPS chip (AGPS). The AGPS operates as follows. From a cold boot-up, a regular (non-assisted) GPS receiver requires a strong signal in order to search and discover satellite 16 signals, decode information relating to satellite 16 positioning, and then calculate its position. This process can sometimes take up to several minutes depending on initial signal strength. This startup time is why GPS users don't like to turn off their GPS receivers. However, an always-on connection is a major problem for battery life in a cell phone 12. AGPS discovers its position with the help of GPS equipment at cell phone towers 14, which maintain a constant strong connection to GPS satellites 16. The cell phone towers 14 use approximate positioning of the cell phone 12 of the present invention and send pre-decoded ephemeris satellite positioning and clock information to the cell phone 12. The result is that the cell phone will provide its position quickly, and thus be more conducive to having its GPS turned off and on to save the battery.

As noted above, the wearable transceiver devices 8 of this invention have accelerometer sensors which detect a perceived fall or a crash. Upon being activated by a perceived fall or crash the appropriate sensor activates a count-down timer in the transmitter. The timer contains a warning means which audibly counts down from a preset number of seconds (preferably 15) to zero. Prior to the time the timer reaches zero, the user 4 may deactivate the transmitter by pressing the below-described communication button 20. The warning means serves to alert the user 4 that a call will be made unless the timer is deactivated. If the timer is not deactivated within the given period of time, the transmitter will send a signal to the home-based landline-based phone 10 or cell phone 12 by the Zigbee system. The transmitter communicates preferably with a landline-based phone 10. In the event such a landline-based phone 10 cannot be detected, the notification system will search for a cell phone 12. If data cannot be sent by one route, the device 8 will automatically select the next best route. Redundant routes which communicate with each other insure high reliability. From any given device 8 there are many different routes the data can take. The dynamic process of polling the network to find the quickest, most reliable, data path is a continual process. If any remote sensor devices in the network are unable to store and forward the data, then the network immediately analyzes and selects an alternate route insuring that the communications gets through to the cell phone 12 or landline-based phone 10. The signal received by the cell phone 12 or landline-based phone 10 activates the phone 10 12 to dial the preprogrammed number of the central monitoring station 6. The landline-based phone 10 makes a direct wire connection with the central monitoring station 6. The cell phone 12 uses the Zigbee system to constantly self-adjust communication routes to connect with and optimize the flow of information to the central monitoring station 6. This "smart routing" means the network is continually optimizing the pattern of communications to ensure the quickest, most reliable, path to the monitor 18. Upon being connected with the central monitoring station 6 the cell phone 12 will transmit the AGPS-determined location cell phone 12 to the central monitoring station 6 via SMS and voice-to-voice connection will be established between the user 4 and the human monitor 18.

A communication button 20 is a prominent feature of the wearable transceiver device 8. This button 20 may be the only button on the wearable transceiver device 8 or it may be one of up to three buttons. When there are other buttons on the device, this button 20 is larger than the others and, when appropriate, centrally located. This makes it easier for a visually handicapped user 4 or a user 4 in a panic mode to find the button 20. To minimize the possibility of false alarms, it is preferred that this button 20 be located at a lower level than the plane of the surface of the wearable transceiver device 8 and to maximize the ease with which the button 20 may be found, it is preferred that there be a raised ring around the button 20. This button 20 may be pushed while the timer is announcing the time remaining before the transmitter will contact the central monitoring station 6 in order to inactivate the transmitter. This button 20 may also be pushed by the user 4 under normal conditions to transmit a preprogrammed signal to the cell phone 12 or landline-based phone 10 to access the number of a central monitoring station 6 through a home-based landline phone 10 or a cell phone 12 to send the geographical coordinates of the cell phone 12 to the human monitor 18 via SMS and put the user 4 in voice-to-voice contact with the human monitor 18 using the transmitter and receiver of the wearable transceiver device 8.

The specification and claims will use the expression "human monitor" 18 to cover someone who is employed by, or otherwise associated with, the provider of the wearable transceiver devices 8 of this invention as well as private caregivers or public safety departments. It should be understood that the landline-based phone 10 and the cell phone 12 may be preprogrammed to contact any desired number. The human monitor 18 at the central monitoring station 6 is available at all times and may assist the user 4 in a variety of ways. The human monitor 18 at the central monitoring station 6 is trained in understanding the needs of at-risk individuals and emergency response protocol so that the human monitor 18 is able to handle each situation appropriately and efficiently. The human monitor 18 may dispatch proper help to the user's 4 location. Since the system 2 uses voice-to-voice technology, the human monitor 18 can determine the needs of the user 4. Even if the user 4 cannot speak, the monitor 18 has instant access to key details of the user's 4 health history, a listing of key contacts, a listing of current medications, and a listing of allergies. The human monitor 18 is thus capable of calling the most appropriate source of assistance. This may be the local emergency response team and a neighbor who has a key to the user's 4 dwelling place to allow the emergency response team to enter the dwelling place of the user 4 without having to break down a door. The human monitor 18 has a prioritized list of caregivers who should be contacted in the event of an incident requiring caregiver assistance. The human monitor 18 stays connected to the user 4 until the proper source of assistance has arrived.

A push of the communication button 20 connects the user 4 with a central monitoring station 6 when roadside assistance is needed and the human monitor 18 can direct appropriate assistance personnel to the vehicle. In the event of a widespread disaster, a push of the communication button 20 connects the user 4 with a human monitor 18 who can reestablish contact between the user 4 and other users 4 in the family, help guide the user 4 out of danger, and help to obtain water, food, etc.

The human monitor 18 may supply the user 4 with local weather reports, local traffic reports, and current stock quotes.

The human monitor 18 can keep track of the speed of a vehicle and the location of a vehicle. The user 4 may be notified when predetermined limits are exceeded. These services may be of value to owners of a stolen vehicle or parents of teenage drivers.

Figure 1:
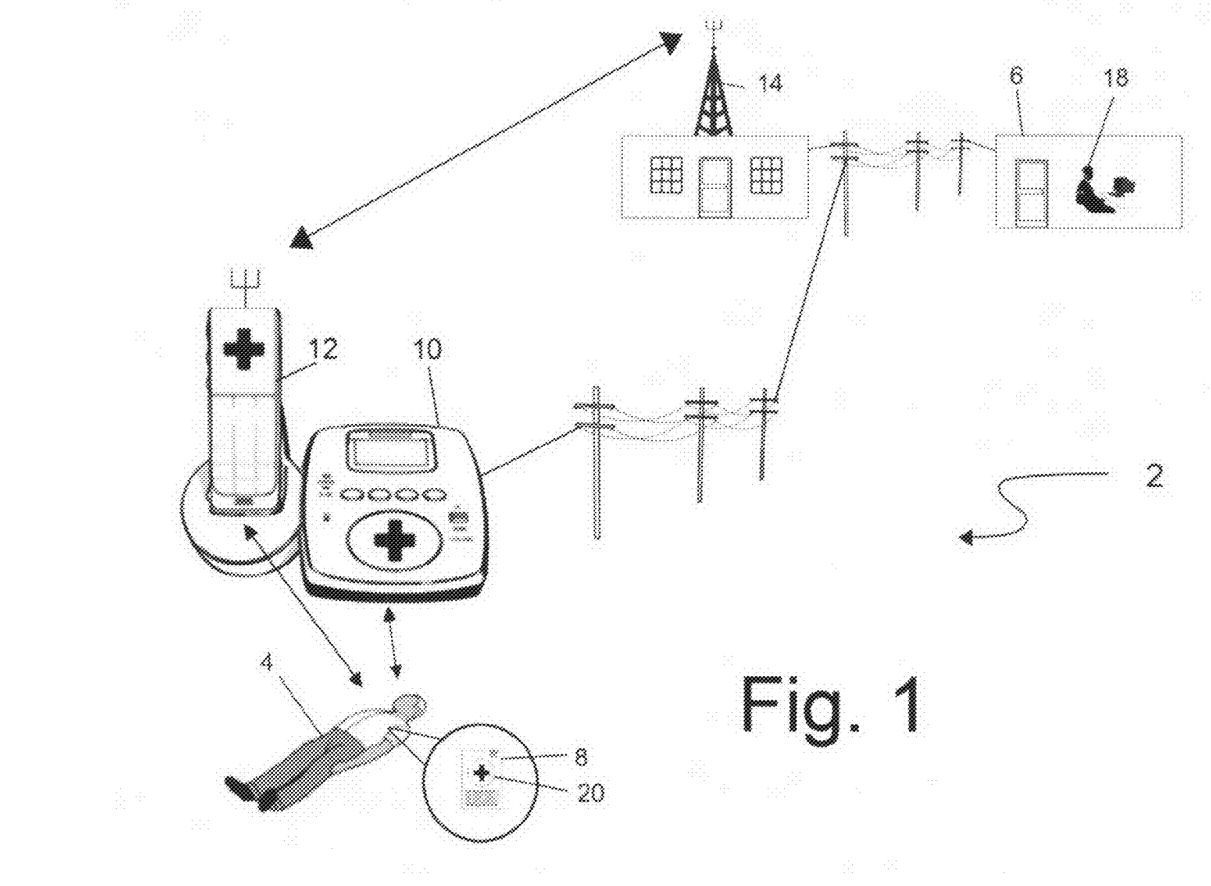
FIG. 1 depicts a user wearing a pendant protected by both a cellular phone and a landline-based phone.
Figure 2:
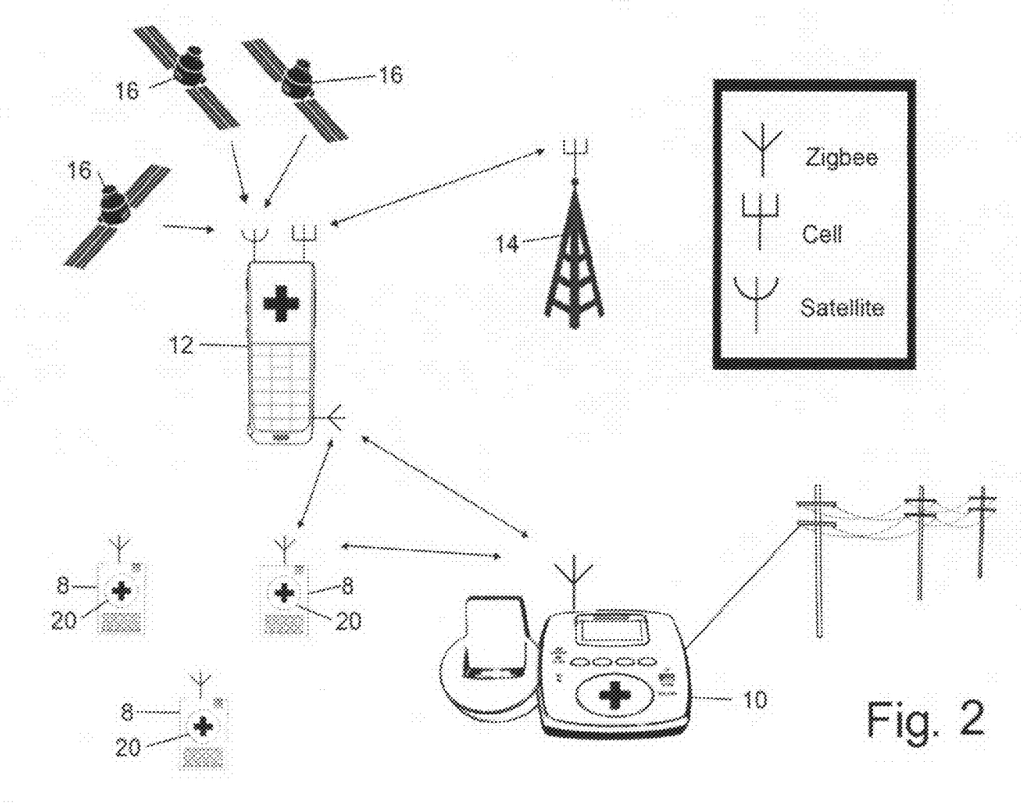
FIG. 2 depicts a plurality of devices which would allow users to talk to the central monitoring station by connection to cell phone or a landline-based phone.
Figure 3:
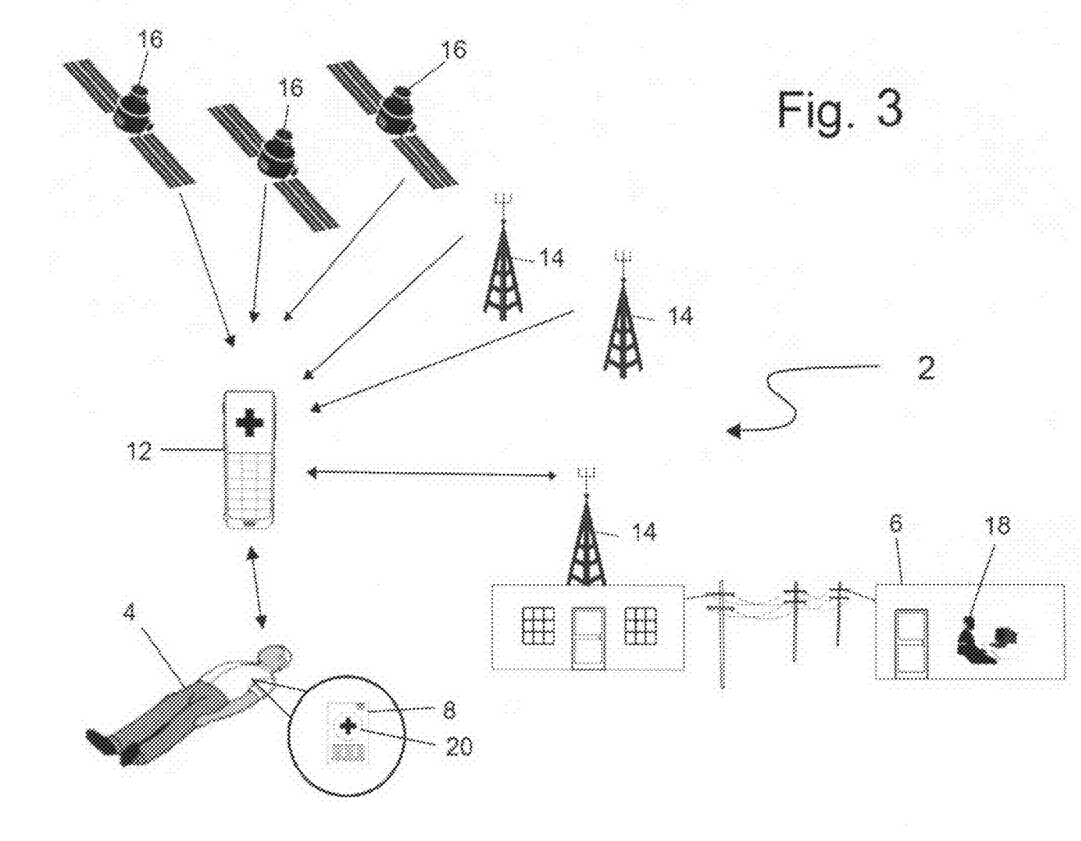
FIG. 3 depicts how a user outside the home would be protected by the cooperative use of the pendant and a cell phone.
Figure 4:
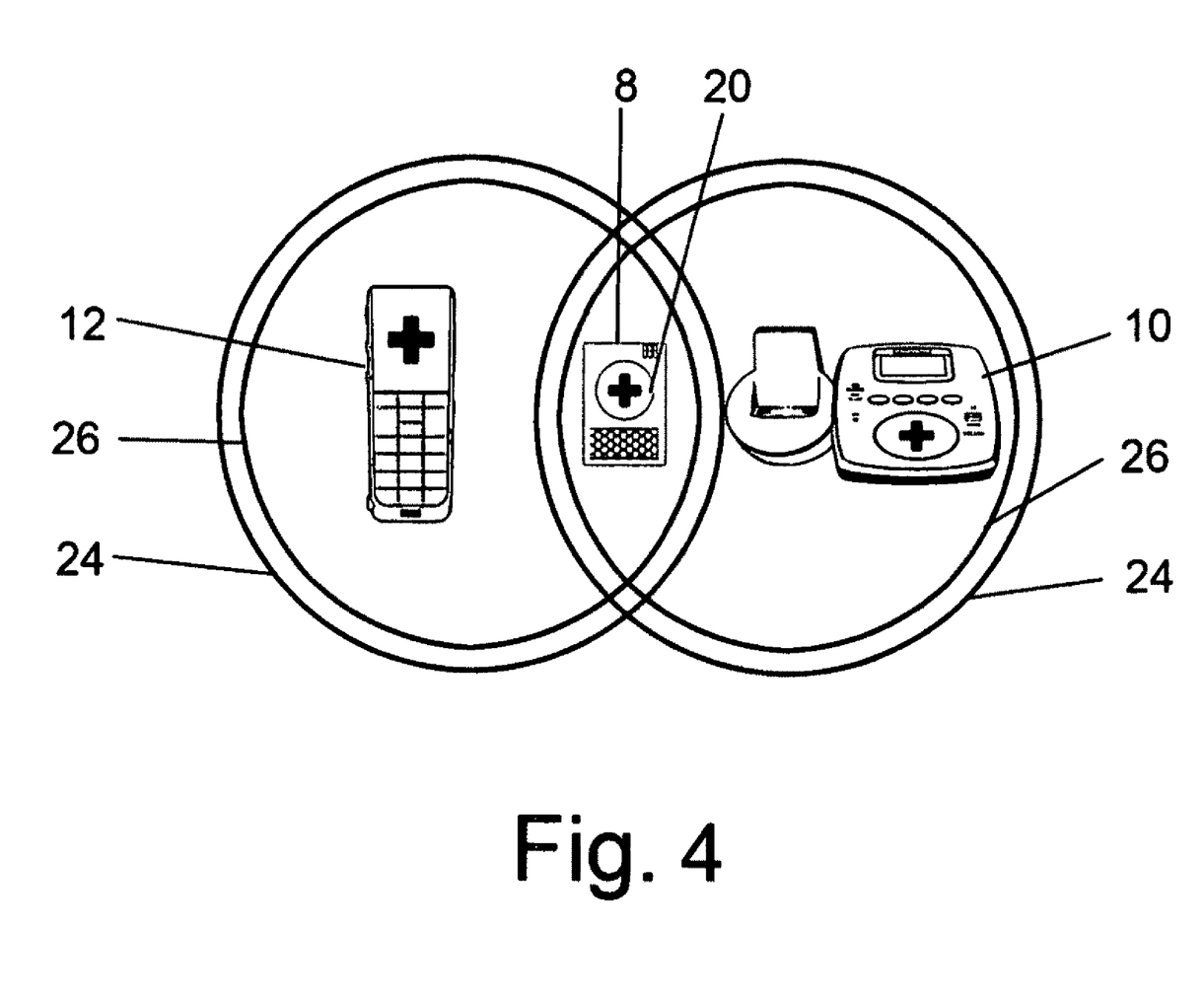
FIG. 4 shows the pendant alarm in two safe zones. It is capable of contacting the cell phone and also the landline-based phone.
Figure 5:
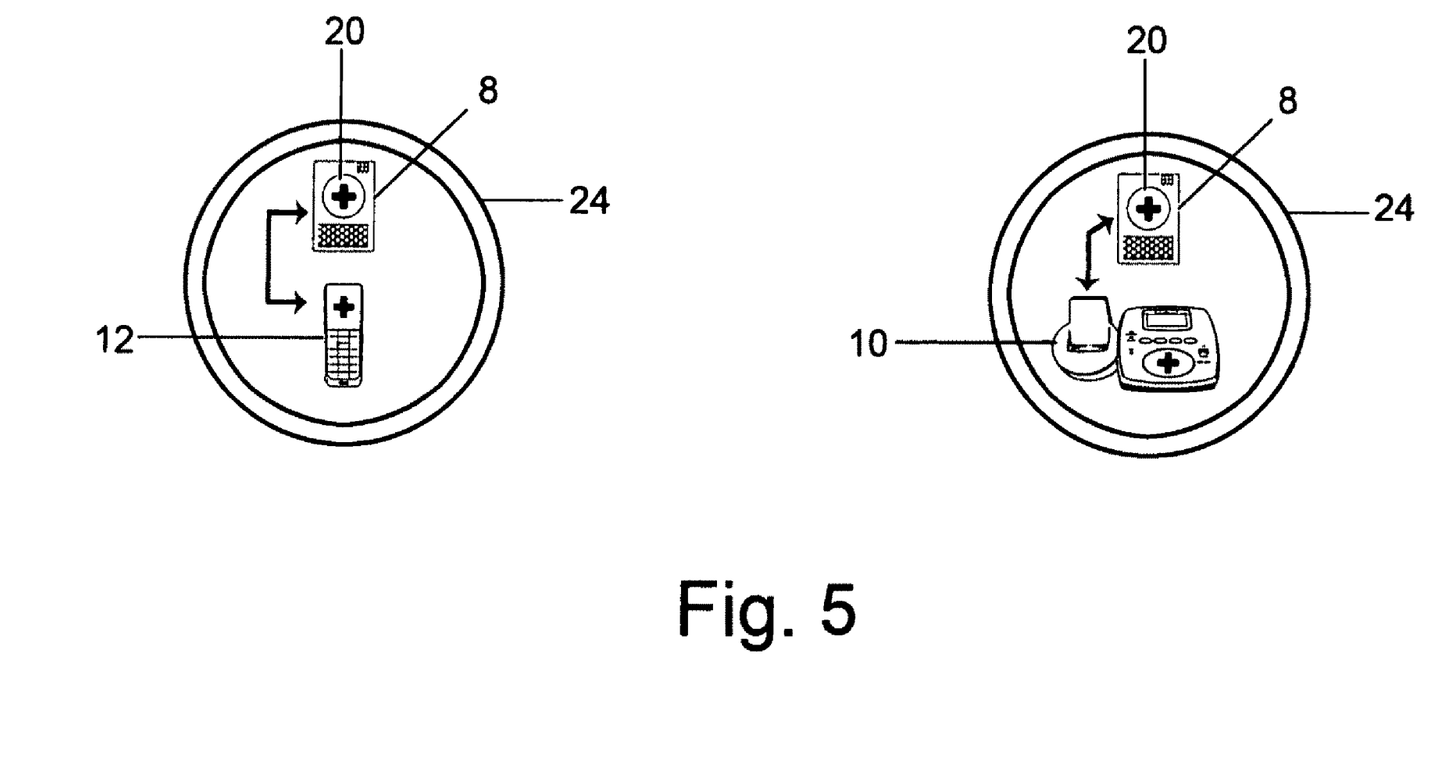
FIG. 5 shows two pendants, one being capable of connecting with a cell phone due to the proximity of the pendant and cell phone, and one being capable of connecting with a land-line-based phone due to the proximity of the pendant and phone. The outer circle in each instance shows a geo-fence or outer range inside which the pendant can connect with the phone. The inner circle in each instance shows the range which will trigger an alarm should the pendant go outside of that range.

The geo-fence 24 will be discussed with reference to FIGS. 4 and 5. The user 4 may establish a geo-fence 24 in a conventional manner. If a user 4 having a wearable transceiver device 8 moves outside the range of the cell phone 12 or the landline-based phone 10 an alarm event will be triggered. If the user 4 having a wearable transceiver device 8 but not having a cell phone 12 starts to go from inside to outside the alarm boundary 26 which is set a predetermined distance, e.g., 75 yards inside of the perimeter of the geo-fence 24, the device 8 starts to beep for 15 seconds, warning the user 4 that the user 4 will not be protected outside of the geo-fence 24. If the user 4 having a wearable transceiver device 8 but no cell phone 12 moves outside the geo-fence 24 the human monitor 18 would automatically be notified. In this way a user 4 with dementia can be alerted that he or she should not continue to stray from a pre-defined area. Also, the GPS function of the cell phone 12 can be used to locate the user 4 in the event the user 4 carrying a cell phone 12 happens to get lost.

An important feature of the present invention is that a plurality of users 4 may carry and operate a plurality of wearable transceiver devices 8 associated with the same home-based land-line phone 10 or cell phone 12. The cell phone 12 and the land-line based phone 10 can work either independently or in conjunction with each other; however if an emergency event is triggered either phone 10 12 can independently call the central monitoring station 6. Thus, if there are two users 4 living together and they both require a wearable transceiver device 8 they would both be protected by the same home-based landline phone 10 or cell phone 12.

The wearable transceiver devices 8 contain small transceivers which send and receive radio signals via the Zigbee system. These devices 8 communicate directly with the home-based landline phone 10 or cell phone 12. The home-based phone 10 and cell phone 12 have RF receivers and transmitters which allow them to use the Zigbee radio system to communicate with the wearable transceiver device 8 and with cell phone towers 14 using radio signals. The cell phone towers 14 can communicate with the satellite 16 of the GPS system using radio signals and with the cell phones 12 or home-based phones 10 using the Zigbee system radio system. Each of the cell phone 12 and the landline-based phone 10 contains a memory which allows it to store phone numbers the user 4 might wish to contact, including that of the central monitoring station 6.

A single user 4 or several users 4 may utilize the same system 2 at any given time. Each user 4 can be identified because the wearable transceiver device 8 has an RFID signature that allows the central monitoring station 6 to know which wearable transceiver device 8, and therefore which user 4, is making a call. For instance, if several users 4 are in a retirement home they can all be protected on the landline-based phone 10 and if for some reason two users 4 send alarms to the central monitoring station 6 at the same time, the central monitoring station 6 would search for the cellular system 2 protecting more than one person 4 at the same time. The RFID identifies a particular user 4 and the central monitoring station 6 has medical information such as allergies, medical history, present medical condition, and present medications on file. Thus, in notifying an emergency response team, useful information concerning the patient 4 may be known by the team before they reach the patient 4, saving valuable time.

EXAMPLE 1

Person One 4 leaves the house with his wearable transceiver device 8 and cell phone 12 and goes outside the geo-fence 24 but still within range of the wearable transceiver device 8 of Person Two 4. Because of the cell phone 12, he is protected as long as the cell phone 12 can contact the central monitoring station 6. Person Two 4, who is at home, slips and falls while wearing a wearable transceiver device 8 and person One 4 is unaware of this. However, the fall sensor in the wearable transceiver device 8 detects a fall and contacts the central monitoring station 6 via the landline-based phone 10. Even if the landline-based phone 10 became unavailable because of cut or downed wires the cell phone 12 would still be available to contact the central monitoring station 6.

EXAMPLE 2

The description of an embodiment of the pendant wearable transceiver device 8 is set forth below.

Ultra-low-power consumption voice stream through the ZigBee platform. It has a 5-year battery-life.

Voice-enabled single chip (MG2450 or 2455) made available by Zigbee for voice-enabled applications such as transceiver operations.

Speaker: 50 mm, high-power 105 dB output powerful speaker with 3-W output. It has crystal clear sound quality and DSP noise-filtering flat-speaker technology (only 6 mm thin in speaker area). Its full duplex speakers emit high-quality sound, plus it has noise- and echo-cancellation technologies that let callers hear the user better as well.

Microphone: With built-in noise canceller extension. Digital signal processor for noise and echo cancellation Low-battery power alarm Digital volume control Emergency SOS panic button Red LED to indicate out of range Certified to Military Standard 810 F for dust, shock, vibration, temperature extremes, low pressure, and solar radiation. It performs in extreme outdoor environments and stands up to dusty environments, drops, exposure to vibration from heavy machinery use, and hot/cold climates.

Certified to Military Standard 810 F for rain, humidity, and salt fog. It is designed to withstand exposure to rain, sleet, and snow. It has rubber casing, interior linings and connections against water intrusion.

The cell phone 12 of the present invention is expressly excluded from the definition of wearable transceiver devices 8, however it has some of the same features found in these devices 8 plus additional features. As can be appreciated from Example 4, the cell phone 12 contains main batteries and reserve batteries. The cell phone 12 contains an assisted GPS chip which allows it to be geographically located. The cell phone 12 has an accelerometer which allows it to detect a crash.

The cell phone 12 has an audible countdown timer to alert the user 4 that a crash has been detected and the existence of this event will be sent directly to the central monitoring station 6 unless the timer is inactivated within a preset time.

The cellular phone 12 contains a communication button which, when pressed, directly connects the phone 12 with the central monitoring station 6. The cell phone 12 has the features of normal cell phones in that its numeric display can be used to contact other phones.

EXAMPLE 3

A description of an embodiment of a cell phone 12 of the present invention is set forth below:

Cold/Warm/Hot start time; 42/38/1 second

Sensitivity −159 dBm tracking

Battery Solution:

Lithium with AAA backup power from Techitium Back-uPower TEC 103+TEC 2020

Standard battery: 1800 mAh Li-Ion High Capacity battery for 60 days of standby time.

Optional Batteries

Figure 6:
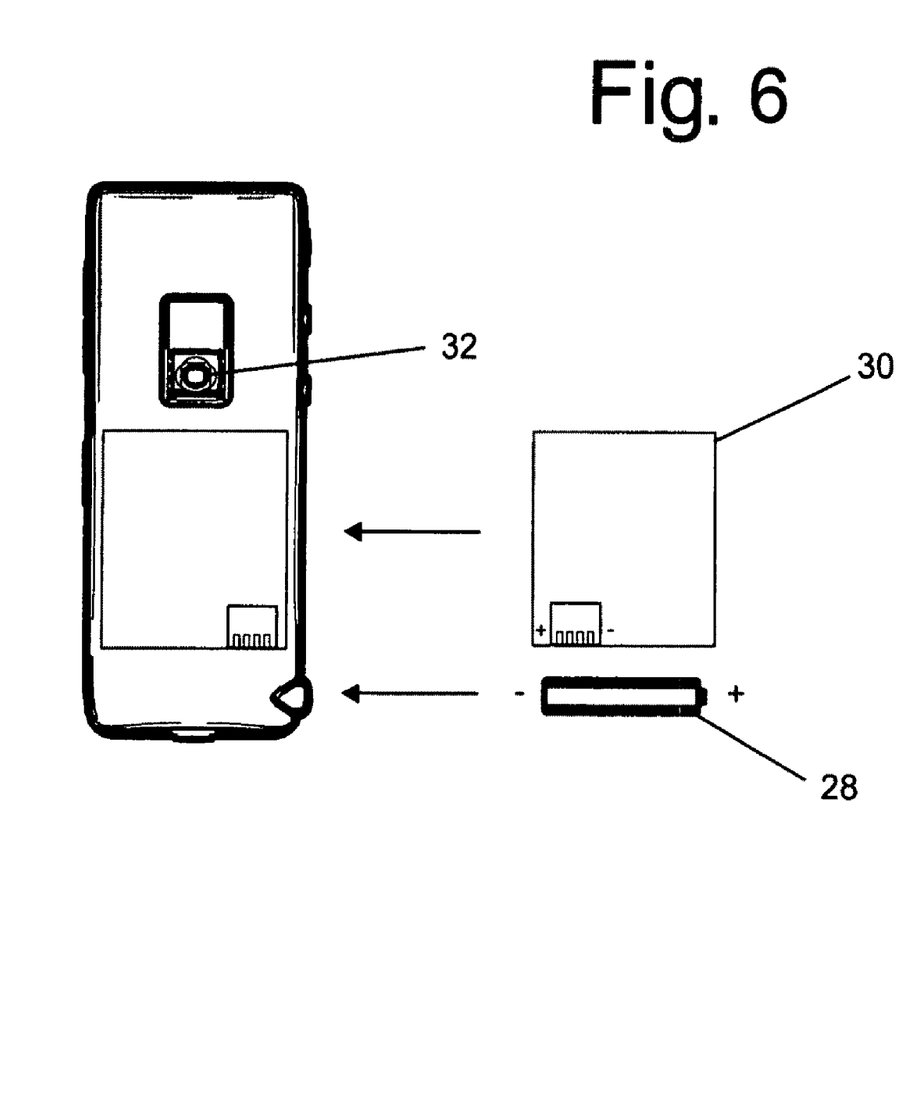
FIG. 6 is an elevated perspective view of a cell phone having conventional batteries and reserve batteries of this invention.

With reference to FIG. 6, the device uses lithium for the primary battery and can use a variety of AAA batteries for backup charging the primary batteries up to 3 hour talk time. Nickel cadmium batteries (NI—NH) which allows the device to keep 85% of its charge for over 3 years if the device is not activated or Alkaline can give up to 10 year shelf life. The battery will be fully charged prior to shipping the product. This allows the device to be stored and used as needed, without losing any power.

Screen

The external display window measures 1.5 inches diagonally (26×26 mm) 128×128 pixels, monochrome with orange backlighting.

Memory

Optional 4 MB flash memory for data logging and/or mapping for different regions.

Microphone

Built-in high performance speaker microphone.

Flashlight

LED Flashlight

Processor

Ultra low power consumption Atmel AVR32UC3B processor

Standby and Talk Time

Standby time of 40 days and talk time of 16 hours. This time is less if GPS tracking is activated.

USB Port

Mini USB port for charging and data exchanging

Battery Charging

Optional induction charging plate that allows the user to simply place the cell phone on the charging plate for recharge (no need for charging cable) www.convenientpower.com.

AGPS

Built-in AGPS (Navizon)/GPS/GSM/SMS modem can send the GPS coordinates via SMS or binary code which allows the cell phone to travel inside buildings and still be tracked.

Accelerometer

Crash detection is by a 3-axis G force sensor accelerometer from BOSCH BMA 150. Crash data is measured in the delta velocity.

Rugged Construction

The cell phone is certified to Military Standard 810 F for dust, shock, vibration, temperature extremes, low pressure, and solar radiation. It performs in extreme outdoor environments and stands up to dusty environments, drops, exposure to vibration from heavy machinery use, and hot/cold climates.

Rain Resistance

The cell phone is certified to Military Standard 810 F for rain, humidity, and salt fog. It is designed to withstand exposure to rain, sleet, and snow. It has rubber casing, interior linings and connections against water intrusion.

Text-to-Speech (TTS) Technology—announces incoming callers' name or Caller ID, device, call status GPS Chip:

GPRS to integrate the data to the server

Additional Features

Polyphonic ring tones, Vibration engine, Low battery power alarm, Way back feature, Firmware upgrade remotely (update phone book remotely), GSM/GPRS simultaneously, SIM 10 code setting, Easy to read large white on black display, Emergency SOS Panic Button, Extra Loud +100 dB Ringer, Large easy-to-read numbers, Vibration Alarm, 250 name and number phone book, Hearing Aid Compatibility with integrated Induction Coil (Rating: M3/T3), Red LED to indicate out of range, ability to answer calls with the user's voice command, digital signal processor for echo and noise cancellation, digital volume control, support for voice dial, and an 80 lumen LED flashlight.

The wearable transceiver devices 8 of the invention may be used in conjunction with other safety devices such as smoke detectors or similar safety devices. If a smoke detector is activated, the wearable transceiver devices 8 of the invention will be activated. If not deactivated within 15 seconds or some similar arbitrary predetermined time, the activated wearable transceiver device 8 will call the landline-based phone 10 or cell phone 12 to be connected to the central monitoring station 6, and, if connected to the monitoring station 6 by the cell phone 12, sending the AGPS-determined location via SMS and a signal informing the monitor of alarm activation.

Wearable transceiver devices 8 of this invention may contain features in addition to those described above. The wearable transceiver device 8 preferably uses reserve or backup battery power using AAA batteries as 28 shown in FIG. 6 to charge the main batteries. 30. Thus, if the main batteries 30 of the cell phone 12 wearable transceiver device 8 are dead and the user 4 pushes the emergency button 32 the reserve battery 26 would charge the main batteries. Therefore, if the user 4 happens to leave the wearable transceiver device 8 in a drawer or glove box without using the device 8 and it loses its charge it has a reserve battery 28 that will charge the primary battery 30 in emergency situations extending the dormant shelf life of the product for several years versus several months.

The wearable transceiver device 8 may contain a second button which is a 411 hot button for directory assistance. The wearable transceiver device 8 may provide turn-by-turn navigation through voice-guided directions or text providing written directions. The wearable transceiver device 8 may provide convenience services regarding products, services, or retail establishments, e.g., restaurants, ATMs, or hotels in the user's 4 area.

A lost cell phone 12 may be located by contacting a monitor 18 who can use AGPS technology to pinpoint the location of the cell phone 12 and who will then advise the user 4 of the phone's 12 location.

The wearable transceiver device 8 may be programmed to remind a user's 4 caregiver or pharmacy to provide scheduled medication for the user 4. The wearable transceiver device 8 may display a notification of low battery life.

A virtual fence 24 may be placed around the device 8 and the user 4 may be notified by email, SMS, or a phone call from the monitor 18 if the fence 24 is breached.

The wearable transceiver device 8 may contain an additional button, which controls the way-back feature. The additional button may be pushed upon departing the vehicle. In the event the user 4 cannot find his or her vehicle in a parking lot, the way-back button may be pushed and an arrow directs the user 4 to the vehicle and the distance is displayed.

The wearable transceiver device 8 may have the feature of induction charging allowing the battery of the device 8 to be recharged simply by laying the device 8 on a recharging pad rather than plugging the device 8 into an electrical outlet.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A safety and security system comprising:
a plurality of wearable transceiver devices carried by a plurality of spaced-apart users, each of said wearable transceiver devices comprising at least one button including a communication button, a radio receiver, and a preprogrammed radio transmitter;

at least one cell phone with an assisted GPS chip for locating the geographical coordinates of the cell phone;

at least one landline-based phone; and a central monitoring station having at least one human monitor, the communication button, the receiver, and the transmitter of each such wearable transceiver device being operationally connected in such a way that a user may press the communication button to establish voice-to-voice contact with the human monitor of the central monitoring station via the landline-based phone or the cell phone and to send the geographical coordinates of the device to the central monitoring station and to establish voice-to-voice communication between the human monitor of the central monitoring station and the user, each such wearable transceiver device capable of operating independently of the other such devices in connecting with the central monitoring station via the landline-based phone or the cell phone;

wherein the wearable transceiver contains at least one 3-axis G-force sensor programmed to be activated by at least one of a crash and a fall, and a count-down timer, each wearable transceiver device being programmed so that upon activation of the 3-axis G-force sensor the countdown timer is initiated and there is an audible countdown from the time a fall or crash is sensed until the timer reaches zero, each such wearable transceiver device being programmed such that the countdown may be deactivated by the pressing of the communication button in which case no signal is sent by the transmitter, each such device further being programmed such that if the timer is not deactivated by the pressing of the communication button, the transmitter automatically contacts a landline-based phone or a cell phone and sends information to the central monitoring station by way of the connected phone.

2. The system of claim 1, wherein there is one sensor which will be activated by a crash producing at least 5 g of force and one sensor which will be activated by a perceived fall producing 1-5 g of force.

3. The system of claim 1, wherein one user is wearing or carrying a wearable transceiver device selected from the group consisting of a key fob, a pendant, a belt clip, and a watch, and one other user is independently wearing or carrying a wearable transceiver device.

4. The system of claim 1, wherein the wearable transceiver devices comprise first batteries to enable the operation of the features requiring electrical energy and there are reserve batteries which are capable of charging the first batteries when an emergency is detected and the charge of the first batteries is too low to transmit voice.

* * * * *